United States Patent
Yamazaki (10) Patent No.: US 11,022,082 B2
(45) Date of Patent: Jun. 1, 2021

(54) FUEL DISTRIBUTION DEVICE

(71) Applicant: Sanoh Industrial Co., Ltd., Tokyo (JP)

(72) Inventor: Nobushi Yamazaki, Koga (JP)

(73) Assignee: SANOH INDUSTRIAL CO., LTD., Tokyo (JP)

( * ) Notice: Subject to any disclaimer, the term of this patent is extended or adjusted under 35 U.S.C. 154(b) by 0 days.

(21) Appl. No.: 16/302,515

(22) PCT Filed: Jan. 18, 2017

(86) PCT No.: PCT/JP2017/001540
§ 371 (c)(1),
(2) Date: Nov. 16, 2018

(87) PCT Pub. No.: WO2017/199466
PCT Pub. Date: Nov. 23, 2017

(65) Prior Publication Data
US 2019/0293214 A1    Sep. 26, 2019

(30) Foreign Application Priority Data

May 19, 2016    (JP) .............................. JP2016-100604

(51) Int. Cl.
*F02M 55/00*    (2006.01)
*F02M 55/02*    (2006.01)
(Continued)

(52) U.S. Cl.
CPC .......... *F02M 55/004* (2013.01); *F02M 55/02* (2013.01); *F02M 61/14* (2013.01); *F16L 19/05* (2013.01)

(58) Field of Classification Search
CPC .... F02M 55/004; F02M 55/005; F02M 55/02; F02M 55/025; F02M 61/14; F16L 19/025–0286

(Continued)

(56) References Cited

U.S. PATENT DOCUMENTS 1,326,970 A * 1/1920 Row ....................... F16L 19/04
285/89
1,977,241 A * 10/1934 Parker ..................... F16L 19/04
285/332.1
(Continued)

FOREIGN PATENT DOCUMENTS

CN        103429884 A    12/2013
CN        104246204 A    12/2014
(Continued)

OTHER PUBLICATIONS

NASA Glenn Research Center, "Volume", Sep. 28, 2006, entire document, retrieved Dec. 16, 2020 (Year: 2006).*
(Continued)

*Primary Examiner* — Hai H Huynh
*Assistant Examiner* — Robert A Werner
(74) *Attorney, Agent, or Firm* — Procopio, Cory, Hargreaves & Savitch LLP (57) ABSTRACT

Provided is a fuel distribution device 1 including a fuel distribution pipe 3, a fuel pipe 4, and a connecting member 5. The fuel distribution pipe 3 has a seat section 21 having a first convex curved surface 24 formed on an outer circumferential surface thereof. The fuel pipe 4 has a seal section 27 having a second concave curved surface 28 formed on an inner circumferential surface thereof, and a second convex curved surface 29 corresponding to the second concave curved surface 28 is formed on an outer circumferential surface thereof. The connecting member 5 presses the seal section 27 against the seat section 21 from an opposite side of the fuel distribution pipe 3. A radius of curvature $SR_2$ of the second concave curved surface 28 is greater than a radius of curvature $SR_1$ of the first convex curved surface 24.

2 Claims, 11 Drawing Sheets

(51) Int. Cl.
  *F02M 61/14* (2006.01)
  *F16L 19/05* (2006.01)
(58) Field of Classification Search
  USPC .......... 285/332.1, 334.5; 123/456, 468, 469, 123/470
  See application file for complete search history.

(56) References Cited

U.S. PATENT DOCUMENTS

| | | | | |
|---|---|---|---|---|
| 5,120,084 | A * | 6/1992 | Hashimoto | F02M 55/005 285/133.11 |
| 5,143,410 | A * | 9/1992 | Takikawa | F02M 55/005 285/197 |
| 5,172,939 | A * | 12/1992 | Hashimoto | F02M 55/005 285/197 |
| 5,667,255 | A * | 9/1997 | Kato | F02M 55/005 285/133.4 |
| 2003/0047945 | A1* | 3/2003 | Schroeder | F16L 19/0283 285/334.5 |
| 2009/0139595 | A1* | 6/2009 | Kato | F02M 55/005 138/109 |
| 2010/0301601 | A1* | 12/2010 | Harvey | F02M 55/005 285/334.5 |

FOREIGN PATENT DOCUMENTS

| | | | | |
|---|---|---|---|---|
| DE | 102004053658 | A1 * | 5/2006 | ............. F02M 55/02 |
| DE | 102004053658 | A1 | 5/2006 | |
| JP | H3-209093 | A | 9/1991 | |
| JP | H8-075075 | A | 3/1996 | |
| JP | 2002-039456 | A | 2/2002 | |
| JP | 2006-194233 | A | 7/2006 | |
| JP | 2009-299717 | A | 12/2009 | |
| JP | 2009299717 | A * | 12/2009 | |
| JP | 2013-199884 | A | 10/2013 | |
| WO | 03/078827 | A1 | 9/2003 | |

OTHER PUBLICATIONS

International Search Report for related International Application No. PCT/JP2017/001540, dated Mar. 14, 2017; pages.

International Preliminary Report on Patentability for International Patent Application No. PCT/JP2017/001540 dated Nov. 29, 2018, in 9 pages.

Office Action for related CN App No. 201780030110.4 dated Mar. 31, 2020, 7 pgs.

* cited by examiner

FUEL DISTRIBUTION DEVICE

CROSS-REFERENCE TO RELATED APPLICATIONS

This application is a U.S. National Stage entry of PCT Application No: PCT/JP2017/001540 filed Jan. 18, 2017, which claims priority to Japanese Patent Application No. 2016-100604, filed May 19, 2016, the contents of which are incorporated herein by reference.

TECHNICAL FIELD

The present invention relates to a fuel distribution device that distributes and supplies fuel to a plurality of fuel injection devices.

BACKGROUND ART

A fuel distribution device used for a direct injection engine or the like includes a fuel distribution pipe which distributes and supplies high-pressure fuel compressed by a high-pressure pump to a plurality of fuel injection devices, a fuel pipe connected to the fuel distribution pipe, and a connecting member that connects the fuel distribution pipe and the fuel pipe.

In a fuel distribution device disclosed in Patent Literature 1, a tip portion (13) spreading in a funnel shape is provided in a fuel pipe. Further, by tightening a screw section (10) of a connecting member to an outer circumferential surface of a fuel distribution pipe, a seal surface (15) of the fuel pipe is pressed against a seal seat surface (16) of the fuel distribution pipe, thereby sealing the seal surface (15) and the seal seat surface (16). Further, Patent Literature 1 describes a conical shape, and a spherical shape corresponding to the seal seat surface (16), as the shape of the seal surface (15).

CITATION LIST

Patent Literature

Patent Literature 1: German Patent Application Publication No. 102004053658

SUMMARY OF INVENTION

Technical Problem

In recent years, a higher fuel pressure is required. In order to increase the fuel pressure, a high surface pressure is required on the seal surface between the fuel distribution pipe and the fuel pipe. The seal surface pressure is determined by an axial force generated by tightening the fuel pipe with respect to the fuel distribution pipe, and a contact area between the fuel distribution pipe and the fuel pipe.

However, in the fuel distribution device described in Patent Literature 1, the seal surface (15) of the fuel pipe has a conical shape or a spherical shape corresponding to the seal seat surface (16). In a case where the seal surface (15) has a conical shape, when the fuel pipe is inclined with respect to the axis of the fuel distribution pipe, the seal surface pressure changes depending on the location. Therefore, it is not possible to stably seal the seal surface (15) and the seal seat surface (16). Further, when the seal surface (15) has a spherical shape corresponding to the seal seat surface (16), since the seal surface (15) and the seal seat surface (16) are in surface contact with each other, the seal surface pressure is dispersed, and it is not possible to efficiently convert the tightening force (axial force) of the connecting member into the seal surface pressure. For this reason, the seal surface pressure between the seal surface (15) and the seal seat surface (16) decreases, and it is not possible to stably seal the seal surface (15) and the seal seat surface (16).

In the regard, an object of the present invention is to provide a fuel distribution device that can stably seal a fuel distribution pipe and a fuel pipe.

Solution to Problem

A fuel distribution device according to an aspect of the present invention includes a fuel distribution pipe which distributes and supplies fuel to a plurality of fuel injection devices, a fuel pipe connected to the fuel distribution pipe, and a connecting member which connects the fuel distribution pipe and the fuel pipe, in which the fuel distribution pipe has a seat section having a first convex curved surface formed on an outer circumferential surface thereof so as to be reduced in diameter in a convex curved surface shape toward a tip on the fuel pipe side, the fuel pipe has a seal section in which a second concave curved surface, which is enlarged in diameter in a concave curved surface shape toward the tip on the fuel distribution pipe side and against which the first convex curved surface abuts, is formed on an inner circumferential surface thereof, and a second convex curved surface corresponding to the second concave curved surface is formed on an outer circumferential surface thereof, the connecting member presses the seal section against the seat section from an opposite side of the fuel distribution pipe, and a radius of curvature of the second concave curved surface is greater than a radius of curvature of the first convex curved surface thereof.

In the fuel distribution device according to an aspect of the present invention, since the connecting member presses the seal section against the seat section from the opposite side of the fuel distribution pipe, the first convex curved surface of the fuel distribution pipe and the second concave curved surface of the fuel pipe are sealed. Further, the seal section of the fuel pipe is expanded toward the tip on the fuel distribution pipe side, and the second concave curved surface, against which the first convex curved surface abuts, is formed on the inner circumferential surface. Therefore, for example, the surface roughness (roughness on the surface) of the second concave curved surface can easily be reduced, by strongly pressing a machining mold against the second concave curved surface. As a result, it is possible to suppress slackness of the seal surface pressure on the first convex curved surface and the second concave curved surface due to collapse of the second concave curved surface. Further, even if the connecting member presses the seal section against the seat section from the opposite side of the fuel distribution pipe, the seal section is only in a state in which a pipe wall is sandwiched between the connecting member and the seat section. Therefore, even if the pressing force of the connecting member is increased to enhance the seal surface pressure, the seal section is hard to be deformed. Further, since the seal section is hard to be affected by the pressure fluctuation of the fuel, the seal section is hard to be deformed even by pressure fluctuation of the fuel. As a result, it is possible to suppress slackness of the seal surface pressure due to deformation of the seal section. Further, since the seal section sandwiched between the connecting member and the seat section is formed in a curved surface shape, it is possible to connect the fuel distribution pipe and the fuel pipe, by inclining the fuel pipe with respect to the axis of the fuel distribution pipe. Further, since the radius of curvature of the second concave curved surface is greater than the radius of curvature of the first convex curved surface, when the seal section is pressed against the seat section by the connecting member, the first convex curved surface and the second concave curved surface are in line contact with each other. Therefore, since the seal surface pressure between the first convex curved surface and the second concave curved surface is concentrated, it is possible to efficiently convert the pressing force of the seal section due to the connecting member into the seal surface pressure. As described above, it is possible to stably seal the fuel distribution pipe and the fuel pipe.

In the above fuel distribution device, the first convex curved surface may be formed in a spherical shape, and a straight line, which connects a point on the second concave curved surface and a center of curvature of the second concave curved surface at the point, may pass through a center of curvature of the first convex curved surface. In this fuel distribution device, the first convex curved surface is formed in a spherical shape, and the straight line, which connects the point on the second concave curved surface and the center of curvature of the second concave curved surface at the point, passes through the center of curvature of the first convex curved surface. Therefore, even if the fuel pipe is connected to the axis of the fuel distribution pipe in an inclined manner, it is possible to maintain the sealed state between the first convex curved surface and the second concave curved surface.

Further, in the above-described fuel distribution device, the connecting member may have a locking inner circumferential surface locked to the second convex curved surface from an opposite side of the fuel distribution pipe, and a screwing section screwed to an outer circumferential surface of the fuel distribution pipe to move the connecting member toward the fuel distribution pipe, and the locking inner circumferential surface may be formed in a conical shape. In this fuel distribution device, the locking inner circumferential surface locks the second concave curved surface from the opposite side of the fuel distribution pipe. Therefore, by screwing the screw section to the outer circumferential surface of the fuel distribution pipe and moving the connecting member to the fuel distribution pipe side, it is possible to press the seal section against the seat section from the opposite side of the fuel distribution pipe. Further, since the locking inner circumferential surface locked to the second convex curved surface is formed in a conical shape, the second convex curved surface and the locking inner circumferential surface are in line contact with each other. Therefore, the pressing force of the seal section due to the connecting member can be efficiently converted into the seal surface pressure between the first convex curved surface and the second concave curved surface.

Advantageous Effects of Invention

According to the present invention, it is possible to stably seal the fuel distribution pipe and the fuel pipe.

DESCRIPTION OF EMBODIMENTS

Hereinafter, a fuel distribution device according to an embodiment will be described with reference to the drawings. In each drawing, the same or corresponding elements are denoted by the same reference numerals, and repeated description will not be provided.

Figure 1:
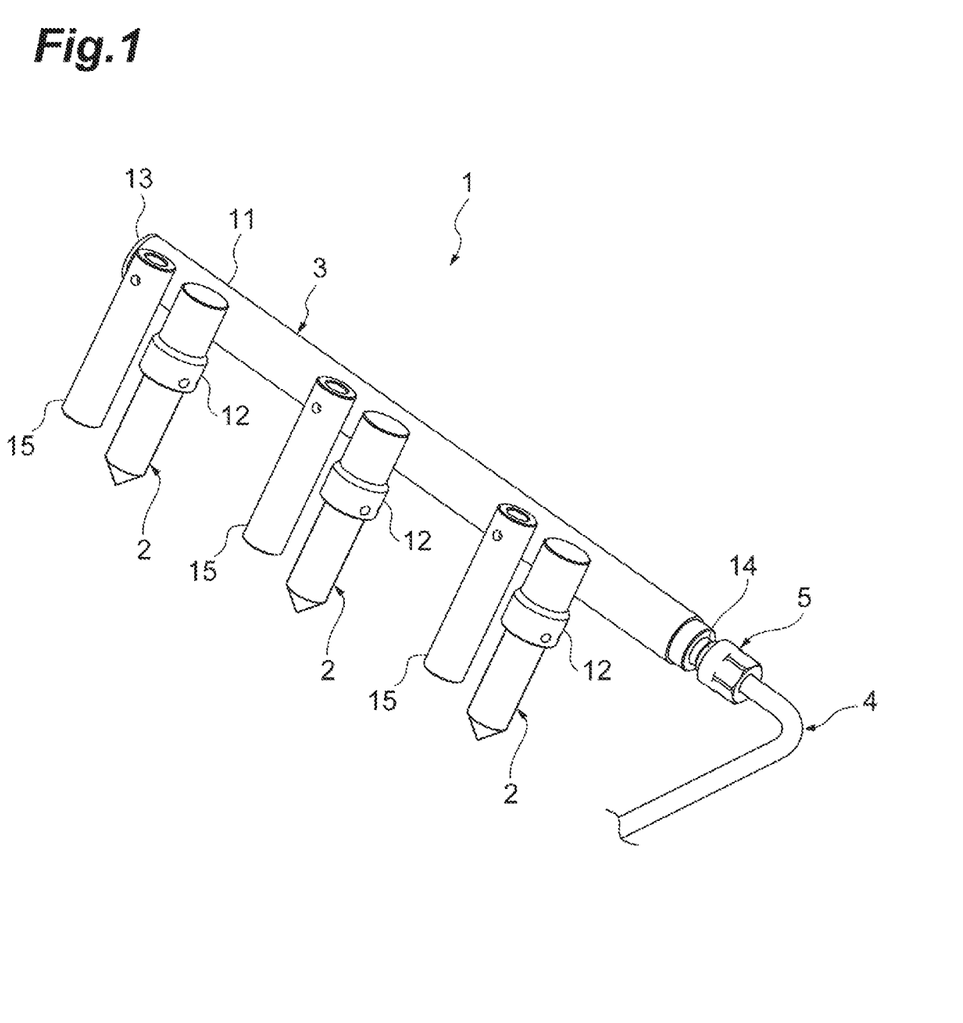
FIG. 1 is a schematic perspective view of a fuel distribution device according to an embodiment.

As illustrated in FIG. 1, a fuel distribution device 1 according to the present embodiment is configured to distribute and supply a high-pressure fuel compressed by a high-pressure pump (not illustrated) to a fuel injection device 2 provided to correspond to each cylinder of an engine (not illustrated). The fuel distribution device 1 includes a fuel distribution pipe 3 which distributes and supplies fuel to a plurality of fuel injection devices 2, a fuel pipe 4 connected to the fuel distribution pipe 3, and a connecting member 5 which connects the fuel distribution pipe 3 and the fuel pipe 4.

The fuel distribution pipe 3 is also referred to as a fuel injection rail, a fuel delivery pipe, a common rail or the like. The fuel distribution pipe 3 includes a pipe section 11, a plurality of cup sections 12, a lid section 13, a connecting section 14, and a fixing boss 15.

Figure 2:
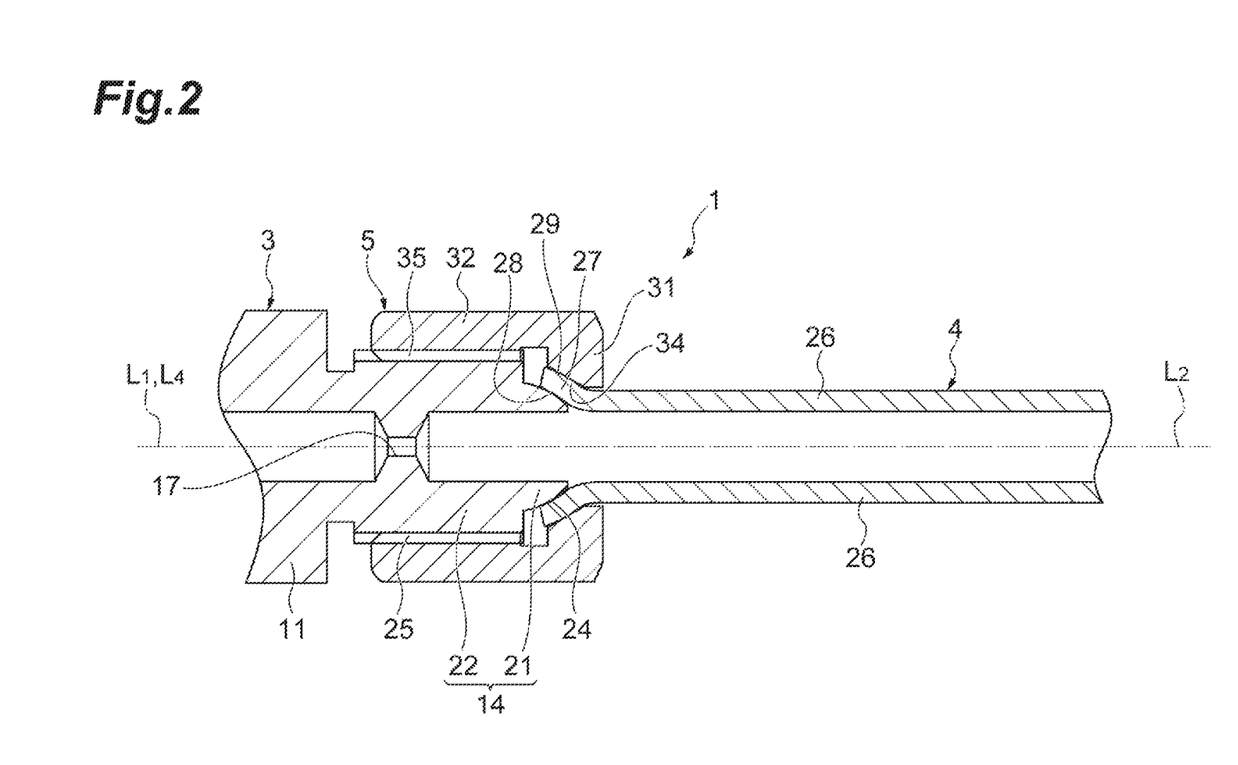
FIG. 2 is a schematic sectional view of the fuel distribution device according to the embodiment.

As illustrated in FIGS. 1 and 2, in order to supply fuel to the plurality of fuel injection devices 2, the pipe section 11 stores the fuel pumped from the high-pressure pump in a high pressure state. The pipe section 11 is formed in a circular pipe shape extending linearly along a cylinder row direction (a crankshaft direction) of the engine. An inner circumferential surface of the pipe section 11 forms a flow path of fuel. A reduced-diameter section 17 having a reduced diameter is formed on the inner circumferential surface of the pipe section 11. The reduced-diameter section 17 relaxes the pressure fluctuation of the fuel by narrowing the flow path of the fuel, and suppresses propagating of the pulsation of the fuel into the pipe section 11. The reduced-diameter section 17 can be, for example, an orifice. A pipe shape of the pipe section 11 does not necessarily have to be a circular pipe shape extending linearly, but can have various shapes.

The cup section 12 is provided to correspond to the fuel injection device 2 and supplies the fuel stored in the pipe section 11 to the fuel injection device 2. The cup section 12 is fixed to the pipe section 11, and holds the fuel injection device 2 so that a space between the cup section 12 and the fuel injection device 2 is kept airtight.

The lid section 13 is located at the end portion of the pipe section 11 on the side (a left side in FIG. 2) opposite to the fuel pipe 4, and closes one end portion of the pipe section 11.

The connecting section 14 is located at an end portion of the pipe section 11 on the fuel pipe 4 side (a right side in FIG. 2) and is connected to the fuel pipe 4. Like the pipe section 11, the connecting section 14 is formed in a circular pipe shape, and the inner circumferential surface of the connecting section 14 forms the flow path of the fuel. The connecting section 14 includes a seat section 21 and a screw section 22.

The seat section 21 is located at an end portion of the connecting section 14 on the fuel pipe 4 side (the right side in FIG. 2), and is pressed against the fuel pipe 4.

A first convex curved surface 24 is formed on the outer circumferential surface of the seat section 21. The first convex curved surface 24 is a seat surface against which the fuel pipe 4 is pressed (abutted), and serves as a seal surface for sealing with the fuel pipe 4. The first convex curved surface 24 is reduced in diameter toward a convex curved surface toward the tip on the fuel pipe 4 side. That is, the first convex curved surface 24 is formed in a convex curved surface shape in the cross section passing through a pipe axis $L_1$ of the connecting section 14. More specifically, the first convex curved surface 24 is formed in a spherical shape having a center point on the pipe axis $L_1$ of the connecting section 14. In other words, the first convex curved surface 24 is formed in an arc shape centered on a point on the pipe axis $L_1$ of the connecting section 14 in the cross section passing through the pipe axis $L_1$ of the connecting section 14.

The screw section 22 is located on the opposite side (the left side in FIG. 2) of the fuel pipe 4 with respect to the seat section 21, and is fastened to the connecting member 5. A male screw 25 for locking the connecting member 5 is engraved on the outer circumferential surface of the screw section 22.

The fixing boss 15 is a member for fixing the fuel distribution pipe 3 to the engine. The fixing boss 15 can be fixed to the engine by bolt tightening, welding, or the like.

The fuel pipe 4 is a pipe for allowing the fuel to flow. For example, the fuel pipe 4 can be a pipe for supplying the high-pressure fuel compressed by the high-pressure pump to the fuel distribution pipe 3. In a case where two fuel distribution pipes 3 are provided so as to be mounted on a V-type engine, the fuel pipe 4 can be a pipe for supplying fuel from one fuel distribution pipe 3 to the other fuel distribution pipe 3. The fuel pipe 4 includes a piping section 26 and a seal section 27.

The piping section 26 is a part for allowing the fuel to circulate. The piping section 26 is formed in a substantially circular pipe shape having substantially the same shape in the longitudinal direction. Further, the piping section 26 is appropriately bent in accordance with the disposed location.

The seal section 27 presses against the seat section 21 to seal a space between the seat section 21 and the seal section 27. The seal section 27 is located on the fuel distribution pipe 3 side of the piping section 26, and is located at the end portion of the fuel pipe 4 on the fuel distribution pipe 3 side. The seal section 27 is expanded like a funnel toward the tip on the fuel distribution pipe 3 side. A second concave curved surface 28 is formed on the inner circumferential surface of the seal section 27, and a second convex curved surface 29 is formed on the outer circumferential surface of the seal section 27.

The second concave curved surface 28 is a surface against which the first convex curved surface 24 is pressed (abutted), and serves as a seal surface for sealing the space between the second concave curved surface 28 and the first convex curved surface 24. The second concave curved surface 28 is expanded in a concave curved surface shape toward the tip on the fuel distribution pipe 3 side. In other words, the second concave curved surface 28 is formed in a concave curved line shape in the cross section passing through a pipe axis $L_2$ of the seal section 27.

Figure 3:
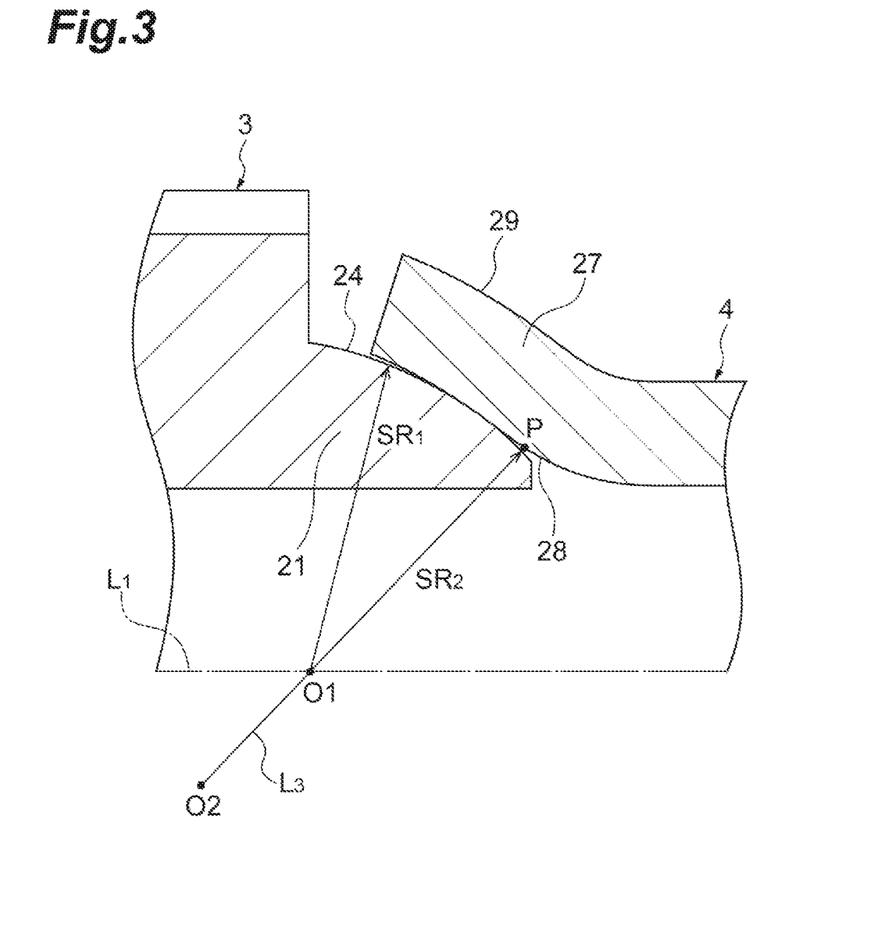
FIG. 3 is a view for describing a relation between a first convex curved surface and a second concave curved surface.

As illustrated in FIG. 3, a radius of curvature $SR_2$ of the second concave curved surface 28 is greater than a radius of curvature $SR_1$ of the first convex curved surface 24. Further, the second concave curved surface 28 is formed in an aspherical shape, and a straight line $L_3$, which connects an arbitrary point P on the second concave curved surface 28 with a center of curvature $O_2$ of the second concave curved surface 28 at the point P, passes through the center of curvature $O_1$ of the first convex curved surface 24. Therefore, the center of curvature $O_2$ of the second concave curved surface 28 is not one point, but the position of the center of curvature $O_2$ changes depending on the position of the point P on the second concave curved surface 28.

The second convex curved surface 29 is a surface against which the connecting member 5 is pressed (abutted). The second convex curved surface 29 has a shape corresponding to the second concave curved surface 28. That is, the second convex curved surface 29 is expanded in a convex curved surface shape toward the tip on the fuel distribution pipe 3 side, and is formed in a convex curved line shape in the cross section passing through the pipe axis $L_2$ of the seal section 27.

Figure 4:
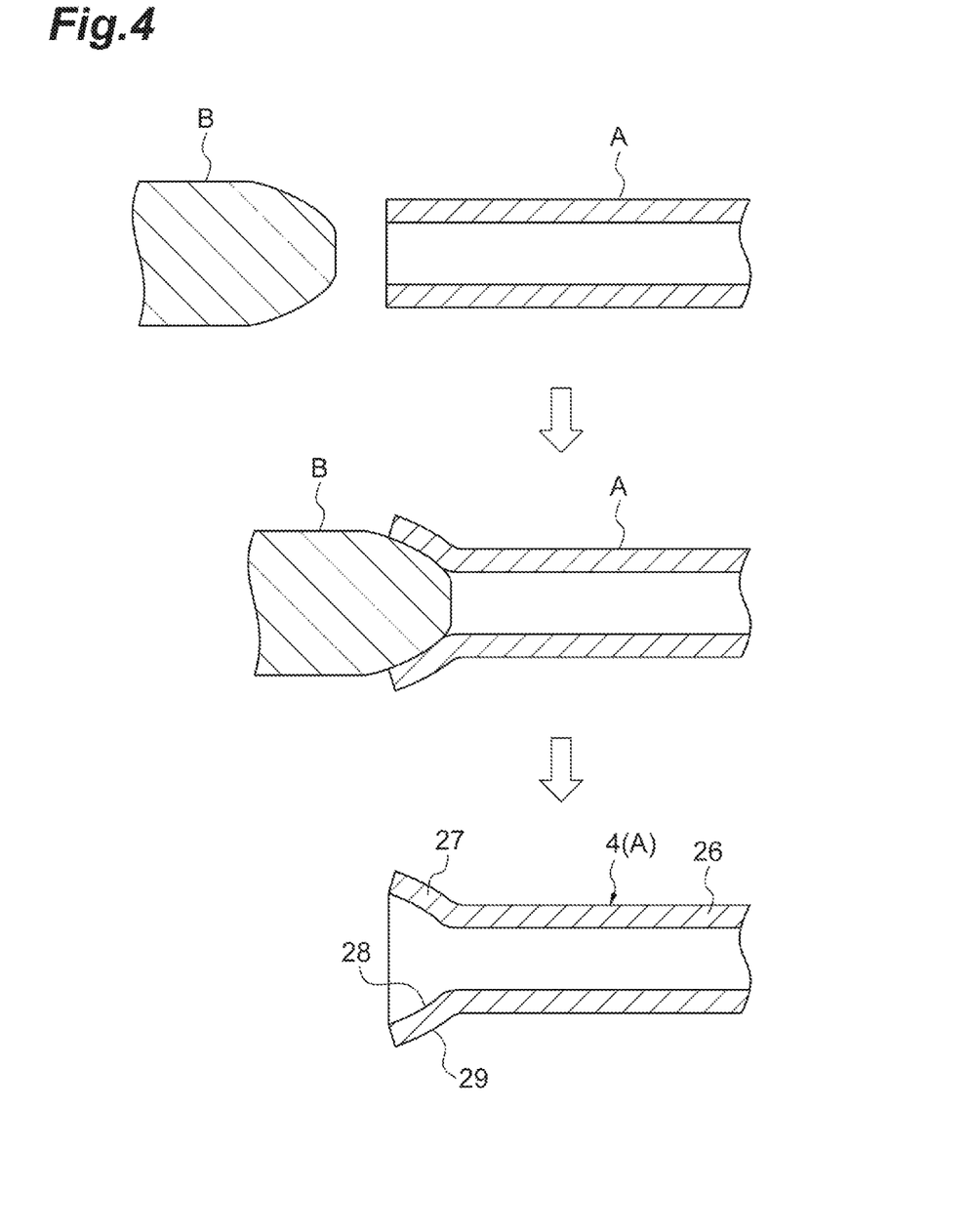
FIG. 4 is a view for describing an example of a method of manufacturing a fuel pipe.

Here, a method of manufacturing the fuel pipe 4 will be described. First, as illustrated in FIG. 4, a circular pipe A having the same diameter over the longitudinal direction is prepared. Further, a machining mold B having a machining surface corresponding to the second concave curved surface 28 is pushed into the circular pipe A, thereby expanding the end portion of the circular pipe A. Thus, the fuel pipe 4 having the second concave curved surface 28 formed thereon is obtained. At this time, the second concave curved surface 28 is formed by pressing the machining surface of the machining mold B against the circular pipe A. Therefore, by reducing the surface roughness of the machining surface of the machining mold B, it is possible to easily reduce the surface roughness of the second concave curved surface 28.

The connecting member 5 seals the first convex curved surface 24 and the second concave curved surface 28, by pressing the seal section 27 against the seat section 21 from the opposite side of the fuel distribution pipe 3.

The connecting member 5 is also referred to as a union nut, a union joint, a joint nut or the like. The connecting member 5 is formed in a cylindrical shape, and the fuel distribution pipe 3 and the fuel pipe 4 are inserted into a space on a radially inner side of the connecting member 5. The central axis $L_4$ of the connecting member 5 coincides with the pipe axis $L_1$ of the connecting section 14 when connecting the fuel distribution pipe 3 and the fuel pipe 4. The connecting member 5 includes a locking section 31 and a screwing section 32.

The locking section 31 is located at the end portion of the fuel pipe 4 side (the right side in FIG. 2) of the connecting member 5, and is locked to the second convex curved surface 29 from the opposite side of the fuel distribution pipe 3. A locking inner circumferential surface 34 to be locked to the second convex curved surface 29 is formed on the inner circumferential surface of the locking section 31 from the opposite side of the fuel distribution pipe 3. The locking inner circumferential surface 34 is formed in a conical shape that decreases in diameter toward the tip on the fuel pipe 4 side, and is formed linearly in a cross section passing through the central axis $L_4$ of the connecting member 5.

The screwing section 32 is located on the side of the fuel distribution pipe 3 (the left side in FIG. 2) with respect to the locking section 31, and screwed to the outer circumferential surface of the fuel distribution pipe 3. A female screw 35 to be screwed to a male screw 25 formed on the outer circumferential surface of the screw section 22 of the connecting section 14 is engraved on the inner circumferential surface of the screwing section 32. Therefore, by screwing the female screw 35 to the male screw 25, the screwing section 32 moves the connecting member 5 to the fuel distribution pipe 3 side. At this time, when the locking inner circumferential surface 34 is locked to the second convex curved surface 29, the connecting member 5 presses the seal section 27 against the seat section 21 from the opposite side of the fuel distribution pipe 3. By screwing the female screw 35 to the male screw 25 and fastening the connecting member 5 to the fuel distribution pipe 3 in this way, an axial force in the direction of the pipe axis $L_1$ is generated in the fuel distribution pipe 3 and the fuel pipe 4. The fuel distribution pipe 3 and the fuel pipe 4 are connected to each other, in a state in which the second concave curved surface 28 is pressed against the first convex curved surface 24 and the second concave curved surface 28 and the first convex curved surface 24 are sealed.

Figure 5:
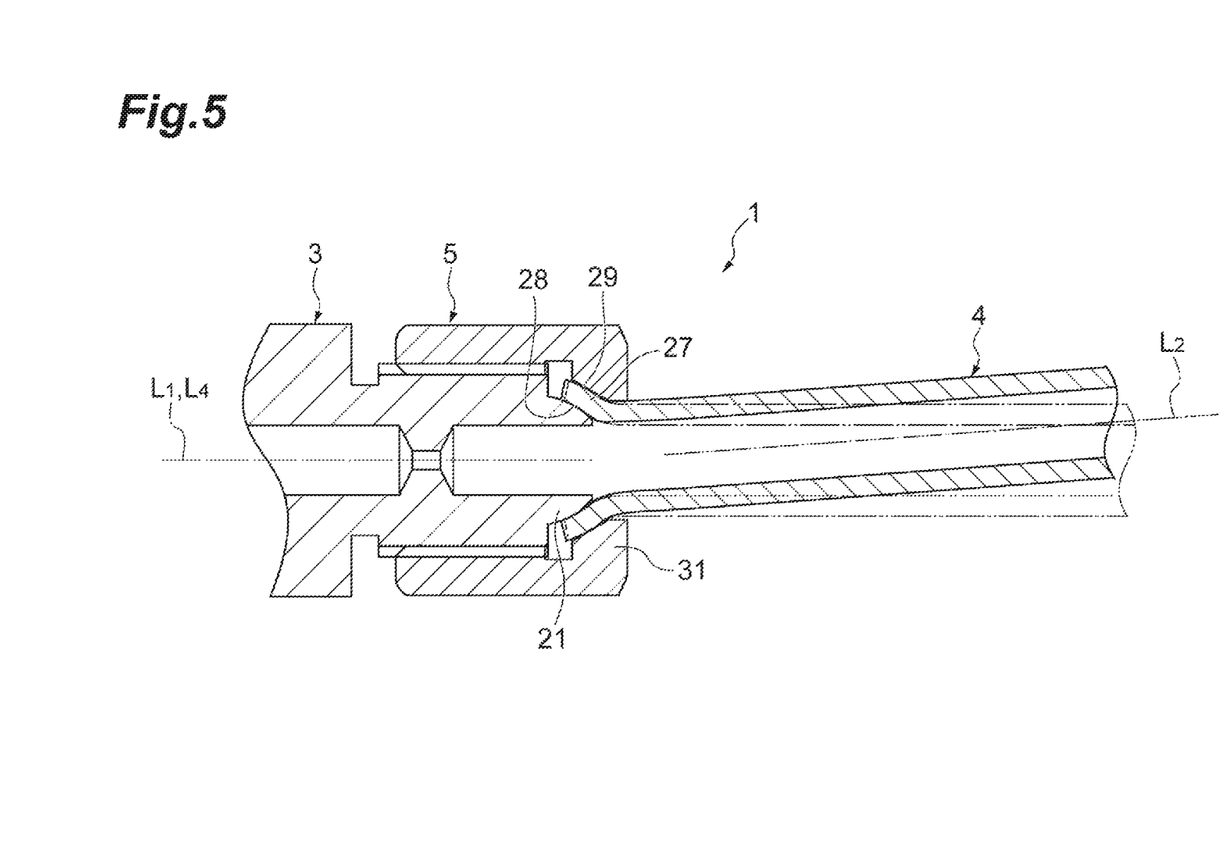
FIG. 5 is a schematic cross-sectional view illustrating a state in which the fuel pipe is inclined with respect to an axis of a fuel distribution pipe.

Further, since the front and back surfaces (the second concave curved surface 28 and the second convex curved surface 29) of the seal section 27 sandwiched between the locking section 31 and the seat section 21 are formed in a curved surface shape, as illustrated in FIG. 5, it is possible to connect the fuel distribution pipe 3 and the fuel pipe 4, by inclining the fuel pipe 4 with respect to the pipe axis $L_1$ of the fuel distribution pipe 3.

Next, the seal surface pressure generated on the seal surface (the first convex curved surface 24 and the second concave curved surface 28) between the fuel distribution pipe 3 and the fuel pipe 4 will be described.

Figure 6:
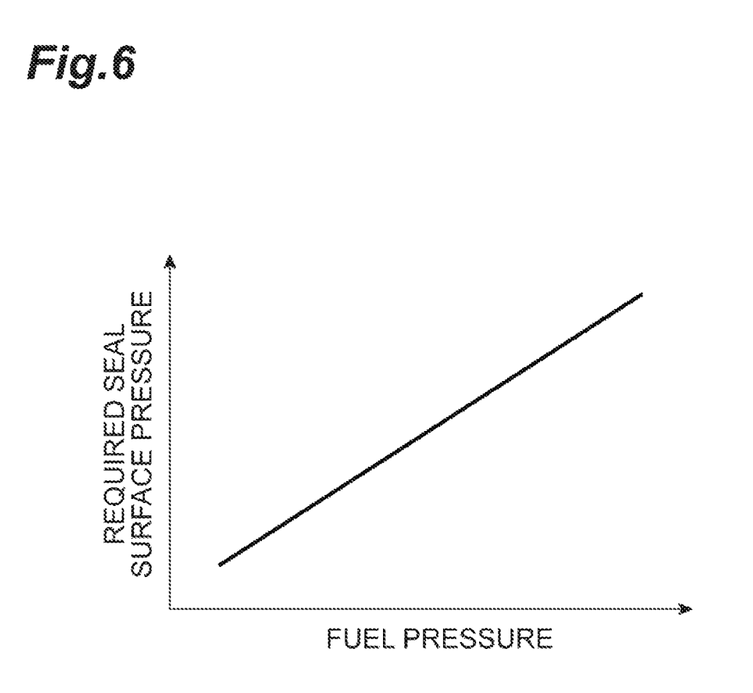
FIG. 6 is a graph showing a relation between a fuel pressure and a required seal surface pressure.

As shown in FIG. 6, since the pressure of the fuel and the seal surface pressure required for the seal surface are in a proportional relation, it is necessary to increase the seal surface pressure of the seal surface in order to increase the pressure of the fuel. The seal surface pressure is determined by the axial force generated by tightening of the connecting member 5 and the contact area between the fuel distribution pipe 3 and the fuel pipe 4.

On the other hand, the seal surface pressure is lowered by the initial slackness and the temporal slackness. The initial slackness is slackness caused by collapse of the contact surface (seal surface) between the fuel distribution pipe 3 and the fuel pipe 4, deformation of the fuel distribution pipe 3 and the fuel pipe 4 due to axial force, and the like. The temporal slackness is slackness caused by deformation of the fuel distribution pipe 3 and the fuel pipe 4 due to the pressure fluctuation of the fuel, or the like.

Therefore, in order to generate the required seal surface pressure on the seal surface, it is necessary to sufficiently increase the axial force generated on the seal surface by controlling the initial slackness and temporal slackness or by considering the initial slackness and the temporal slackness.

Figure 7:
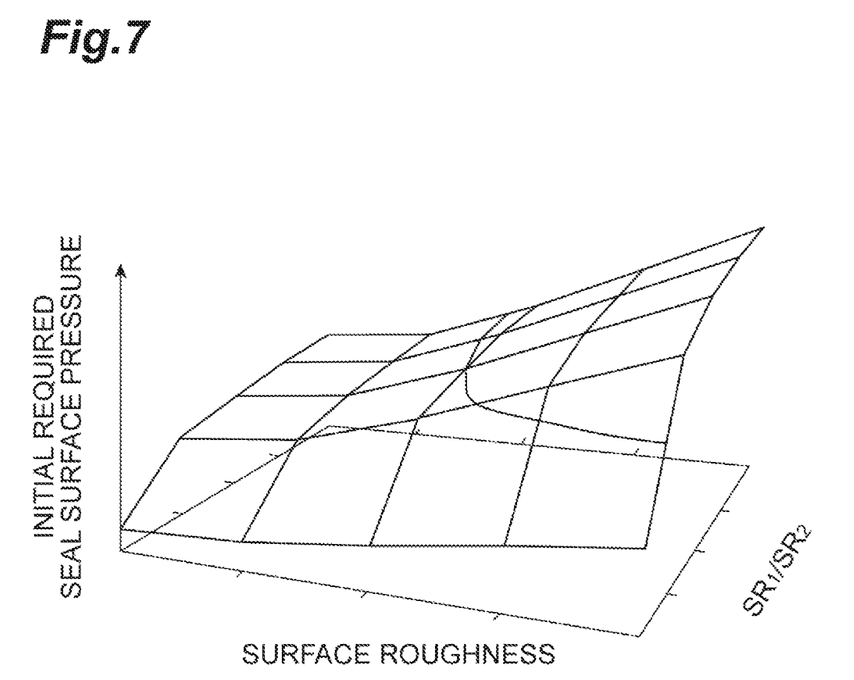
FIG. 7 is a graph showing a relation among a surface roughness and $SR_1/SR_2$ and an initial required seal surface pressure.

In order to suppress the initial slackness, it is effective to improve the surface roughness of the seal surfaces of the fuel distribution pipe 3 and the fuel pipe 4 (see FIG. 7), and to reduce the stress generated at the connecting section of the fuel distribution pipe 3 and the fuel pipe 4. Note that, FIG. 7 shows that, as the surface roughness of the seal surface decreases, the seal surface pressure required at the beginning decreases. In order to suppress the temporal slackness, it is effective to adopt a structure that does not receive the pressure fluctuation of the fuel at the connecting section of the fuel distribution pipe 3 and the fuel pipe 4, and the like.

In the fuel distribution device 1 according to the present embodiment, the seal section 27 of the fuel pipe 4 is expanded toward the tip on the fuel distribution pipe 3 side, and a second concave curved surface 28 against which the first convex curved surface 24 abuts is formed on the inner circumferential surface thereof. For this reason, for example, it is possible to easily reduce the surface roughness of the second concave curved surface 28 by strongly pressing the machining mold against the second concave curved surface 28 (see FIG. 3). As a result, it is possible to suppress slackness (initial slackness) of the seal surface pressure due to collapse of the second concave curved surface 28.

Further, even if the connecting member 5 presses the seal section 27 against the seat section 21 from the opposite side of the fuel distribution pipe 3, the seal section 27 is only in a state in which a pipe wall is sandwiched between the connecting member 5 and the seat section 21. Therefore, even if the pressing force of the connecting member 5 is increased to enhance the seal surface pressure, since only the compressive stress is generated in the seal section 27, the seal section 27 is hard to be deformed. Further, since the seal section 27 is hard to be affected by the pressure fluctuation of the fuel, the seal section 27 is hard to be deformed even by pressure fluctuation of the fuel. As a result, it is possible to suppress slackness (initial slackness and temporal slackness) of the seal surface pressure due to deformation of the seal section 27.

Figure 8:
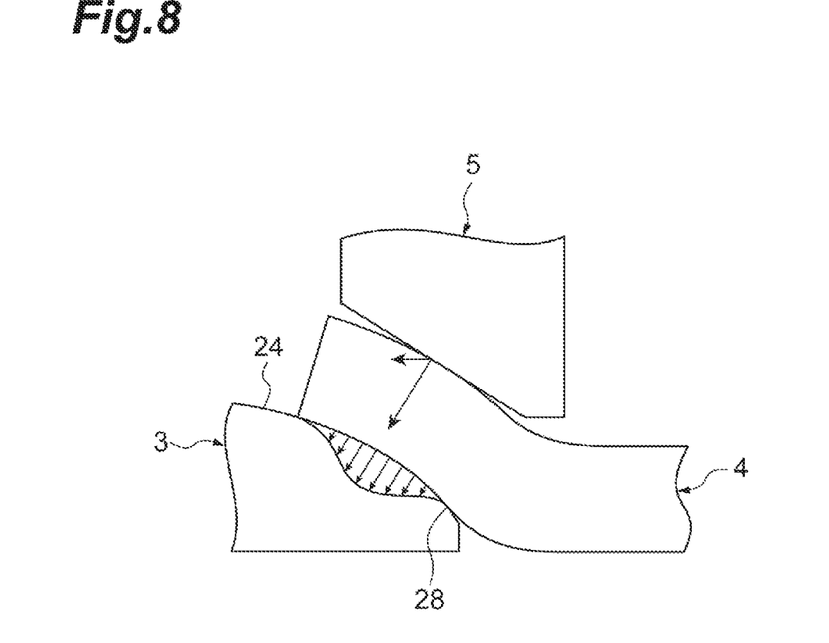
FIG. 8 is a view for describing a pressure distribution of a seal surface in a comparative example.

Here, a comparative example in which the radius of curvature $SR_2$ of the second concave curved surface 28 and the radius of curvature $SR_1$ of the first convex curved surface 24 are the same as illustrated in FIG. 8 will be considered. In this comparative example, when axial force is generated in the fuel distribution pipe 3 and the fuel pipe 4 by the connecting member 5, the seal surface pressure generated on the seal surface (the first convex curved surface 24 and the second concave curved surface 28) is dispersed. Therefore, in order to generate a high seal surface pressure, it is necessary to tighten the connecting member 5 to generate a large axial force in the fuel distribution pipe 3 and the fuel pipe 4.

Figure 9:
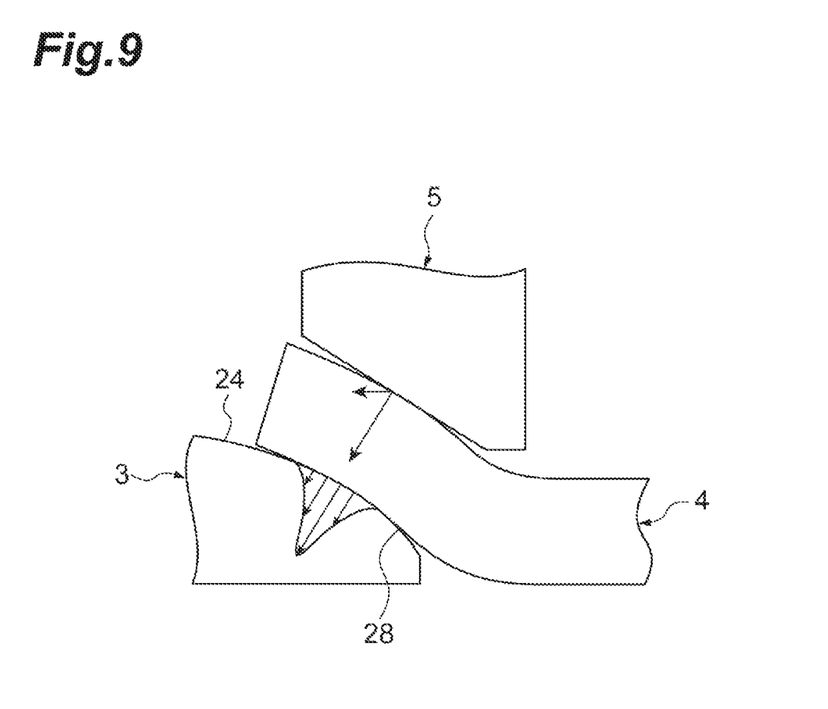
FIG. 9 is a view for describing a pressure distribution of a seal surface in the embodiment.

In contrast, as illustrated in FIG. 9, in the present embodiment, since the radius of curvature $SR_2$ of the second concave curved surface 28 is greater than the radius of curvature $SR_1$ of the first convex curved surface 24, when the seal section 27 is pressed against the seat section 21 by the connecting member 5, the first convex curved surface 24 and the second concave curved surface 28 make line contact with each other. Therefore, when tightening the connecting member 5 to generate the axial force in the fuel distribution pipe 3 and the fuel pipe 4, it is possible to concentrate the seal surface pressure generated on the seal surfaces (the first convex curved surface 24 and the second concave curved surface 28). Therefore, the axial force generated by tightening the connecting member 5 can be efficiently converted into the seal surface pressure. That is, it is possible to generate a higher seal surface pressure than the comparative example against the axial force generated by the connecting member 5.

Figure 10:
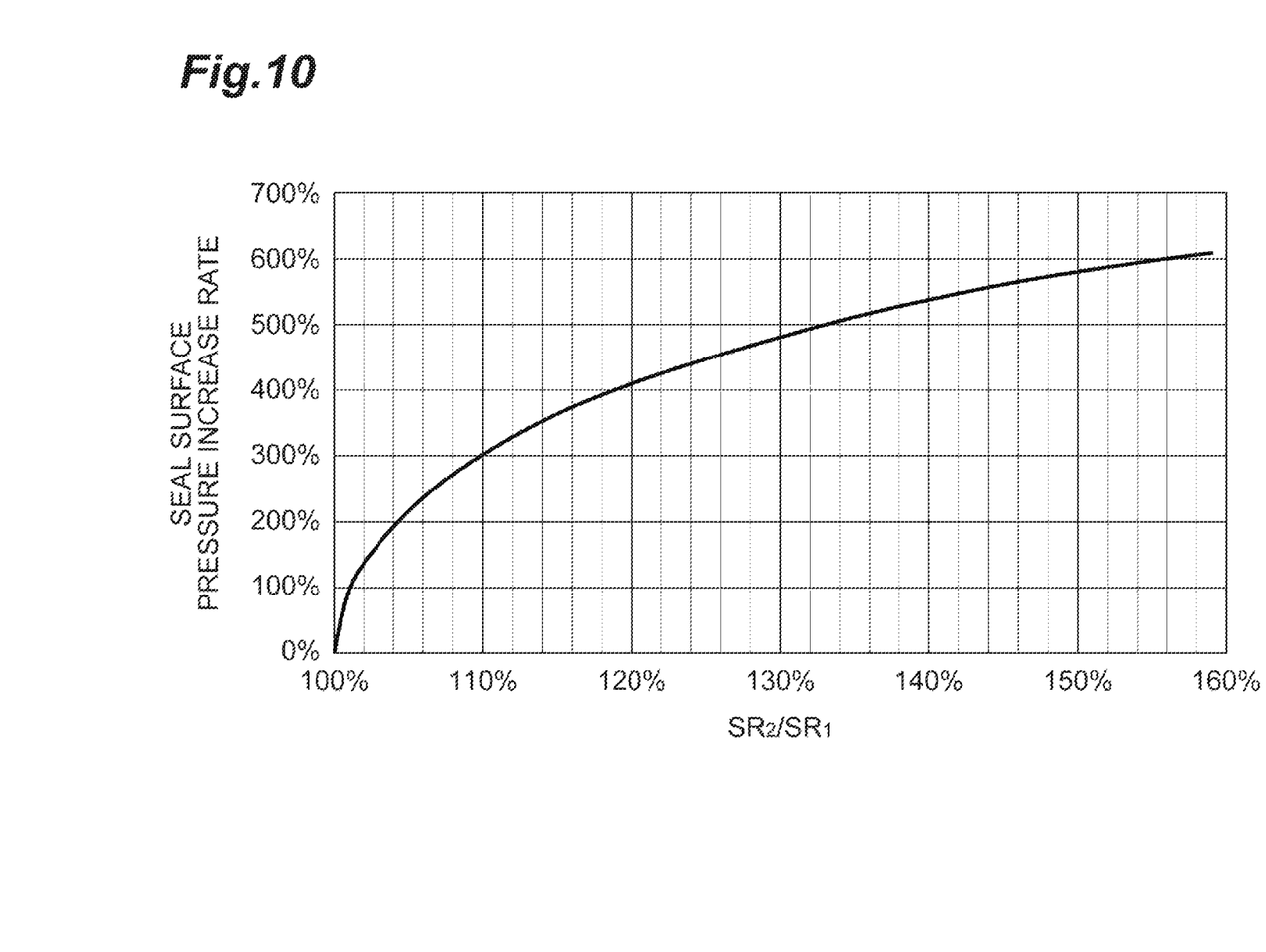
FIG. 10 is a graph showing a relation between $SR_1/SR_2$ and a seal surface pressure increase rate.

As shown in FIG. 7, as the ratio ($SR_1/SR_2$) of the radius of curvature $SR_1$ of the first convex curved surface 24 to the radius of curvature $SR_2$ of the second concave curved surface 28 decreases, the contact area between the first convex curved surface 24 and the second concave curved surface 28 decreases. Thus, the seal surface pressure required at the beginning becomes small. Further, as shown in FIG. 10, as the ratio ($SR_2/SR_1$) of the radius of curvature $SR_2$ of the second concave curved surface 28 to the radius of curvature $SR_1$ of the first convex curved surface 24 increases, the contact area between the first convex curved surface 24 and the second concave curved surface 28 decreases. Thus, the increase rate of the seal surface pressure increases.

Further, when the first convex curved surface 24 is manufactured by cutting, it is about 6 to 7 grades in reality with a JIS tolerance grade. When the second concave curved surface 28 is molded by pressing, it is about 10 grade in reality with the JIS tolerance grade. Considering dimensional variations of the first convex curved surface 24 and the second concave curved surface 28 due to such a tolerance, when the radius of curvature $SR_2$ of the second concave curved surface 28 is set to 1.01 times (101%) or more of the radius of curvature $SR_1$ of the first convex curved surface 24, the radius of curvature $SR_2$ of the second concave curved surface 28 can be set to be greater than the radius of curvature $SR_1$ of the first convex curved surface 24. Therefore, the radius of curvature $SR_2$ of the second concave curved surface 28 can be set to 1.01 times (101%) or more of the radius of curvature $SR_1$ of the first convex curved surface 24.

Further, as shown in FIG. 10, until the ratio of the radius of curvature $SR_2$ of the second concave curved surface 28 to the radius of curvature $SR_1$ of the first convex curved surface 24 increases to some extent, the seal surface pressure changes greatly due to the dimension variations of the first convex curved surface 24 and the second concave curved surface 28. Therefore, the radius of curvature $SR_2$ of the second concave curved surface 28 can be further set to 1.03 times (103%) or more, further 1.05 times (105%) or more of the radius of curvature $SR_1$ of the first convex curved surface 24.

On the other hand, as shown in FIG. 10, if the radius of curvature $SR_2$ of the second concave curved surface 28 increases to some extent with respect to the radius of curvature $SR_1$ of the first convex curved surface 24, the increase rate of the seal surface pressure decreases, and it is difficult to obtain sufficient cost-effectiveness. Therefore, the radius of curvature $SR_2$ of the second concave curved surface 28 can be set to 2.00 times (200%) or less, furthermore, 1.50 times (150%) or less of the radius of curvature $SR_1$ of the first convex curved surface 24.

Further, as illustrated in FIG. 3, the first convex curved surface 24 is formed in a spherical shape, and a straight line $L_3$, which connects an arbitrary point P on the second concave curved surface 28 and the center of curvature $O_2$ of the second concave curved surface 28 at the point P, passes through the center of curvature $O_1$ of the first convex curved surface 24. Therefore, even if the fuel pipe 4 is connected to the pipe axis $L_1$ of the fuel distribution pipe 3 in an inclined manner (see FIG. 5), it is possible to maintain the seal state between the first convex curved surface 24 and the second concave curved surface 28.

Further, since the locking inner circumferential surface 34 locked to the second convex curved surface 29 is formed in a conical shape, the second convex curved surface 29 and the locking inner circumferential surface 34 make line contact with each other. Therefore, the pressing force of the seal section 27 due to the connecting member 5 can be efficiently converted into the seal surface pressure.

Although preferred embodiments of the present invention have been described above, the present invention is not limited to the above-described embodiments.

Figure 11:
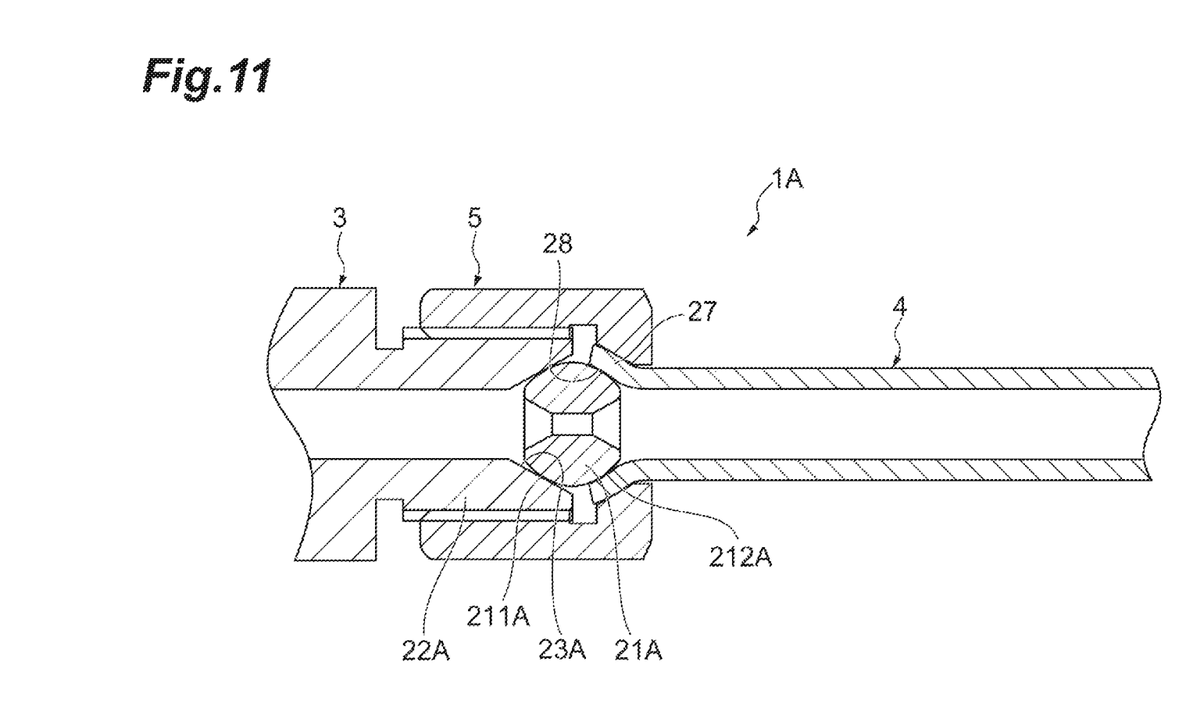
FIG. 11 is a schematic cross-sectional view of a fuel distribution device according to a modified example.

For example, in the above-described embodiment, the seat section 21 is illustrated as being integrated with the screw section 22, but as in the fuel distribution device 1A illustrated in FIG. 11, the seat section 21A may be separated from the screw section 22A. In the fuel distribution device 1A illustrated in FIG. 11, the seat section 21A is a member constituting the fuel distribution pipe, but is an independent member. Further, on the outer circumferential surface of the seat section 21A, a first seal surface 211A abutting against the seat surface 23A formed on the inner circumferential surface of the screw section 22A, and a second seal surface 212A abutting against the second concave curved surface 28 of the seal section 27 are formed. According to such a configuration, since the seat surface 23A is located on the inner circumferential surface, it is possible to suppress the damage of the seat surface 23A at the time of transporting the fuel distribution pipe 3 or the like.

REFERENCE SIGNS LIST

1: fuel distribution device, 2: fuel injection device, 3: fuel distribution pipe, 4: fuel pipe, 5: connecting member, 11: pipe section, 12: cup section, 13: lid section, 14: connecting section, 15: fixing boss, 17: reduced-diameter section, 21: seat section, 22: screw section, 24: first convex curved surface, 25: male screw, 26: piping section, 27: seal section, 28: second concave curved surface, 29: second convex curved surface, 31: locking section, 32: screwing section, 34: locking inner circumferential surface, 35: female screw, 1A: fuel distribution device, 21A: seat section, 211A: first seal surface, 212A: second seal surface, 22A: screw section, 23A: seat surface, A: circular pipe, B: machining mold, $L_1$: pipe axis of connecting section, $L_2$: pipe axis of seal section, $L_3$: straight line, $L_4$: central axis of connecting member, $O_1$: center of curvature of first convex curved surface, $O_2$: center of curvature of second concave curved surface, P: point on second concave curved surface, $SR_1$: radius of curvature of first convex curved surface, $SR_2$: radius of curvature of second concave curved surface.

The invention claimed is:

1. A fuel distribution device comprising:
a fuel distribution pipe which distributes and supplies fuel to a plurality of fuel injection devices;
a fuel pipe connected to the fuel distribution pipe; and
a connecting member which connects the fuel distribution pipe and the fuel pipe,
wherein the fuel distribution pipe has a seat section having a first convex curved surface formed on an outer circumferential surface thereof so as to be reduced in diameter in a convex curved surface shape toward a tip on the fuel pipe side,
the fuel pipe has a seal section in which a second concave curved surface, which is enlarged in diameter in a concave curved surface shape toward the tip on the fuel distribution pipe side and against which the first convex curved surface abuts, is formed on an inner circumferential surface thereof, and a second convex curved surface corresponding to the second concave curved surface is formed on an outer circumferential surface,
the connecting member presses the seal section against the seat section from an opposite side of the fuel distribution pipe, a radius of curvature of the second concave curved surface is greater than a radius of curvature of the first convex curved surface, the first convex curved surface is formed in a spherical shape, the second concave curved surface is formed in an aspherical shape, a straight line, which connects a point on the second concave curved surface and a center of curvature of the second concave curved surface at the point, passes through a center of curvature of the first convex curved surface, and a position of the center of curvature of the second concave curved surface changes depending on a position of the point on the second concave curved surface, and wherein the connecting member has     a locking inner circumferential surface locked to the second convex curved surface from an opposite side of the fuel distribution pipe, and a screwing section screwed to an outer circumferential surface of the fuel distribution pipe to move the connecting member toward the fuel distribution pipe, and     the locking inner circumferential surface is formed in a conical shape, the conical shape having a linear cross-section passing through the central axis of the connecting member.

2. The fuel distribution device according to claim 1, wherein the radius of curvature of the second concave curved surface is set to be more than or equal to 1.01 times of the radius of curvature of the first convex curved surface; and wherein the radius of curvature of the second concave curved surface is set to be less than or equal to 2.00 times of the radius of curvature of the first convex curved surface.

\* \* \* \* \*